United States Patent
Landau

(10) Patent No.: US 9,549,640 B2
(45) Date of Patent: Jan. 24, 2017

(54) FREE FLOW CONTROL DISPENSER DEVICE AND METHOD

(71) Applicant: Ofer Landau, Eyn Vered (IL)

(72) Inventor: Ofer Landau, Eyn Vered (IL)

(*) Notice: Subject to any disclaimer, the term of this patent is extended or adjusted under 35 U.S.C. 154(b) by 0 days.

(21) Appl. No.: 14/729,072

(22) Filed: Jun. 3, 2015

(65) Prior Publication Data

US 2015/0359388 A1   Dec. 17, 2015

Related U.S. Application Data

(60) Provisional application No. 62/012,425, filed on Jun. 16, 2014.

(51) Int. Cl.
*A47J 47/01* (2006.01)
*A47J 47/04* (2006.01)

(52) U.S. Cl.
CPC ............ *A47J 47/01* (2013.01); *A47J 47/04* (2013.01)

(58) Field of Classification Search
CPC .................................. A47J 47/01; A47J 47/04
USPC ............ 222/516, 410, 414, 367, 363, 339, 108,222/548, 508, 181.1–181.3, 185.1, 153.14, 517
See application file for complete search history.

(56) References Cited

U.S. PATENT DOCUMENTS

| | | | | |
|---|---|---|---|---|
| 1,790,228 A * | 1/1931 | Chambers | ............ | A47K 5/1214 222/158 |
| 2,841,312 A * | 7/1958 | Duarte | ..................... | A47K 5/10 222/181.2 |
| 3,993,225 A * | 11/1976 | Manni | ................ | B65G 65/4827 111/130 |
| 5,139,172 A * | 8/1992 | Brown | ................. | A47K 5/1214 222/181.2 |
| 5,230,300 A | 7/1993 | Mezhinsky | | |
| 5,947,336 A | 9/1999 | Thompson | | |
| D471,407 S | 3/2003 | Rivkin | | |
| 7,082,891 B2 | 8/2006 | Watson | | |
| 7,878,376 B2 | 2/2011 | Ben Shlomo et al. | | |
| 2008/0190964 A1* | 8/2008 | Ben Shlomo | .......... | A47G 19/34 222/368 |

FOREIGN PATENT DOCUMENTS

EP           2294948           3/2011

* cited by examiner

*Primary Examiner* — Donnell Long
(74) *Attorney, Agent, or Firm* — Edward Langer

(57) ABSTRACT

A dry food dispensing device for controlling the portion size of the dispensed food, comprising a storage receptacle for containing dry foods, wherein the receptacle is seated over a base providing a housing for a dispensing mechanism, the dispensing mechanism comprising:
  a turnable free flow valve having wings, capable of rotation to an opening angle defined by a position limiter; and
  a depressible handle for controlling the free flow valve via the position limiter,
wherein the dispensing mechanism releases a portion of the dry food, with the portion being determined by a user as a function of time the turnable free flow valve is held at the opening angle.

16 Claims, 6 Drawing Sheets

FREE FLOW CONTROL DISPENSER DEVICE AND METHOD

FIELD OF THE INVENTION

The present invention relates generally to bulk dispensing systems for dry foods, and more particularly to a dispenser having a quantity-control system.

BACKGROUND OF THE INVENTION

Dry food dispensers are widely used for various types of food and in many establishments. Dispensers are popularly used for breakfast cereals in hotels, but not limited to them only.

Food dispensers are used for various sizes of food. Often when large pieces of food are being dispensed, they get crushed by the dispensing mechanism.

Another problem that occurs when using a dispenser is food leakage, so that the user ends up with a larger quantity of food than planned, or a piece of food becomes wedged between the dispensing mechanism and the spout, thus compromising the freshness of the food.

Yet another problem with food dispensers is the gap between the desirable amount and the dispensed amount, i.e. the difficulty in controlling the dispensed amount.

There is a need for a dispenser which eliminates the above difficulties.

SUMMARY OF THE INVENTION

Accordingly, it is a principal object of the present invention to overcome the limitations of prior art dispensers.

The inventive free flow control dispenser is designed to dispense food, stored in a receptacle, in portions determined by the user.

In accordance with a preferred embodiment of the present invention, there is provided a dry food dispensing device for controlling the portion size of the dispensed food, said device comprising:

a storage receptacle for containing dry foods, wherein said receptacle is seated over a base providing a housing for a dispensing mechanism, said dispensing mechanism comprising:

a turnable free flow valve having wings, wherein said valve is turnable to an opening angle defined by means for position limiting; and a depressible handle for controlling said free flow valve via said means for position limiting, wherein said dispensing mechanism releases a portion of the dry food, wherein said portion is determined by a user as a function of time said turnable free flow valve is held at said opening angle.

The inventive free-flow control dispenser of the preferred embodiment provides dispensing of varying portions controlled by the user, while avoiding leakage of the food and maintaining freshness of the food stored in a receptacle.

According to a preferred embodiment of the present invention, the turnable free flow valve can be turned to an adjustable angle, such that a larger angle will dispense a larger amount of the dry food than a smaller angle. The user chooses the dispensed quantity by adjusting the valve angle position and also by how long the valve is maintained at that position. The longer the position is maintained—the larger will be the quantity dispensed.

According to a preferred embodiment of the present invention, position limiting is provided by a rotatable handle-position stop that allows the valve angle adjustment. The rotatable handle-position stop rotates in a corresponding groove of a fixed handle-position limitator, such that when the rotatable stop hits the edge of the groove, it cannot move anymore. The rotatable handle-position stop is connected to the valve via a shaft, to control the movement of the valve.

According to an alternative embodiment of the present invention, the free flow dispenser may be adapted for use by a household pet, such as a dog or cat, by adapting the handle to fit an animal's paw.

Additional features and advantages will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

It is a principal object of the present invention to provide a system for dispensing dry foods, quantities of which are controlled by the user.

Figure 1:
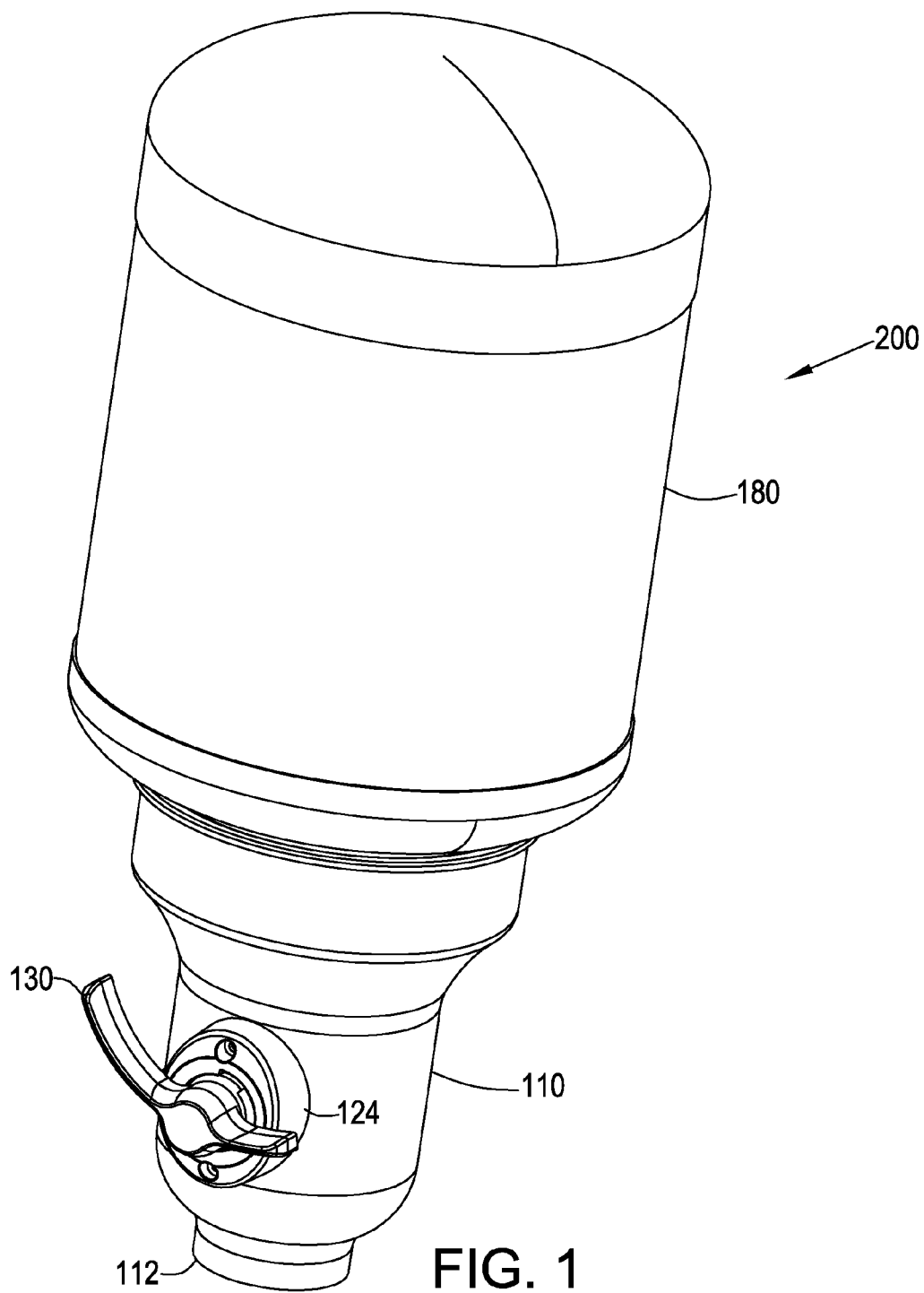
FIG. 1 shows the free flow dispenser of the present invention, attached to a receptacle.

Referring now to FIG. 1, there is shown a free-flow dry food dispenser 200, having a food storage receptacle 180 removably connected to the top of base 110. Base 110 has a depressible handle 130 disposed on its front. Handle 130 is depressed, thereby activating the dispensing means (not shown) inside base 110, to allow the dry food stored in receptacle 180 to exit dispenser 200 through dispensing aperture 112 on the bottom of base 110. Food continues to be dispensed as long as handle 130 is held depressed, and when handle 130 is released it returns automatically to its original position, and food is no longer dispensed. The dispensing method is described hereinbelow in FIG. 2.

Figure 2:
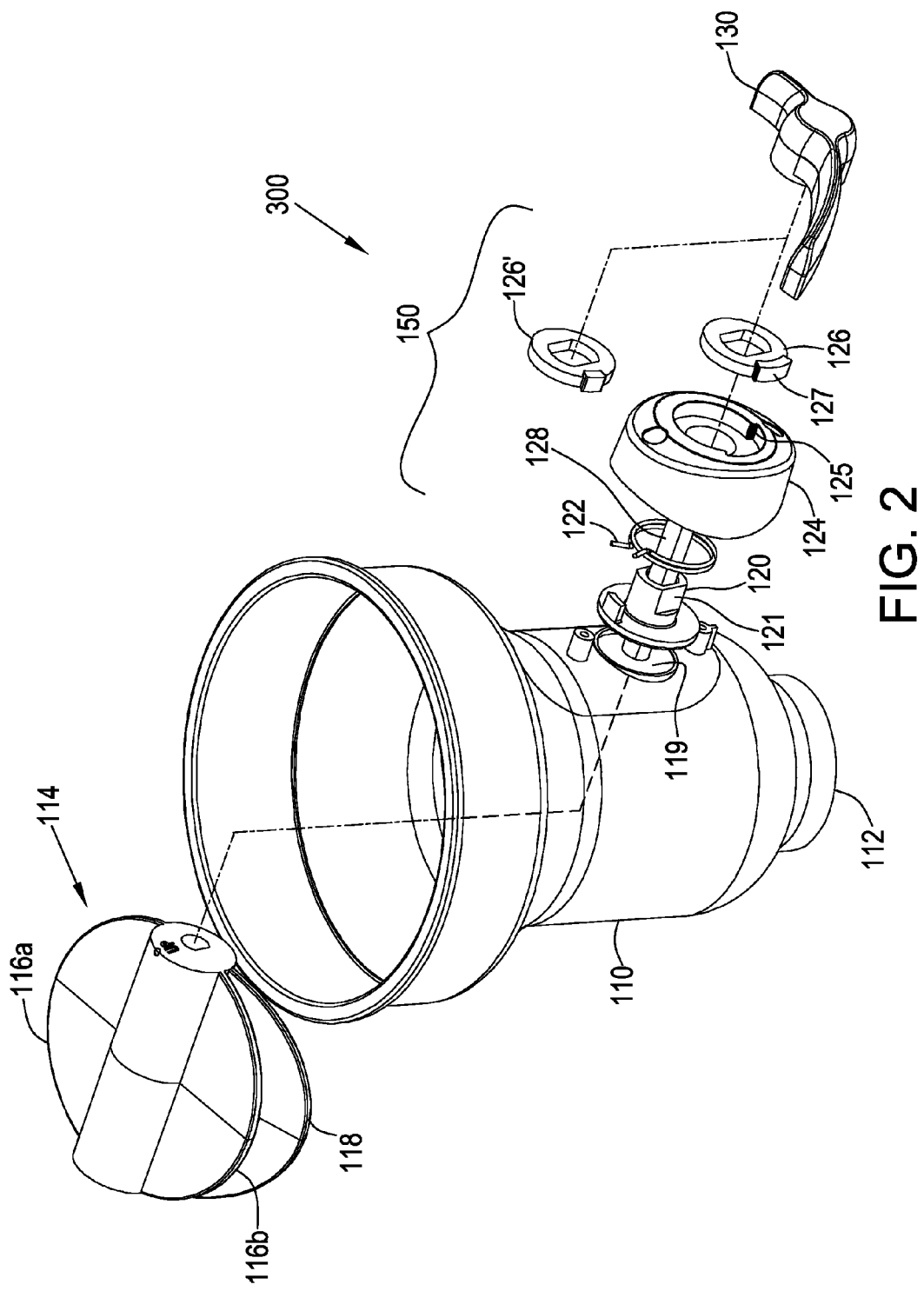
FIG. 2 shows an exploded view of the dispenser of FIG. 1.

Referring now to FIG. 2, there is shown a perspective exploded view of free-flow dispenser 200 of FIG. 1, showing all its components in the order of their appearance.

Depressible handle 130 and valve 114 are connected via handle actuator 150 having a square shaft 128 inserted into each of its components (described below). Each of the ends of shaft 128 are inserted into one of handle 130 or valve 114, so that when depressing handle 130, valve 114 turns. Valve 114 has two identical rounded wings 116a-b disposed on each side of valve 114 in the same plane, such that they fit into the internal circumference of base 110, and when maintained at a level position, they block the exit of the stored dry food. Valve 114 has a third wing 118 which is slightly longer than wings 116a-b, and is disposed beneath wing 116b at an angle, for the purpose of blocking any food from leaking out of aperture 112 and maintaining the freshness of the stored dry food. When handle 130 is depressed, valve 114 rotates counter-clockwise to an opening angle, thereby allowing food to pass through base 110 and out of dispenser 200 through aperture 112.

For determining the maximum opening angle that valve 114 will be allowed to turn, there is provided as part of handle actuator 150, position limiting means in the form of a rotatable handle-position stop 126 having a circumferential shoulder 127 which fits into a fixed handle-position stop 124 having an internal truncated rim 125. Rotatable stop 126 rotates counter-clockwise along with handle 130 when it is depressed, inside of fixed handle-position stop 124 along its internal truncated rim 125. When circumferential shoulder 127 hits the edge of truncated rim 125, stop 126 cannot rotate anymore, and handle 130 cannot continue to be depressed further.

Rotatable handle-position stop 126 may be designed with a variation in the length of circumferential shoulder 127, in order to determine the maximum opening angle to which valve 114 can rotate. For example, if shoulder 127 is longer, then handle position stop 126 can rotate less before it hits the edge of truncated rim 125, thereby reducing the opening angle to which handle 130 can become depressed. Alternatively, with a shorter shoulder 127, more rotation of handle position stop 126 is possible. On the reverse side of fixed handle position stop 124, there is attached spring 122 which is connected to a spring base 120 having a flat portion 121 which fits, from behind, into the center of fixed handle position stop 124, and the center of rotatable handle position stop 126. Spring base 120 is positioned within base socket 119 that is embedded in base 110. When handle 130 is released after being depressed, spring 122 twists handle actuator 150 clockwise back to its original position, thereby rotating valve 114 back to its original position and blocking the exit of the stored food.

Figure 3A:
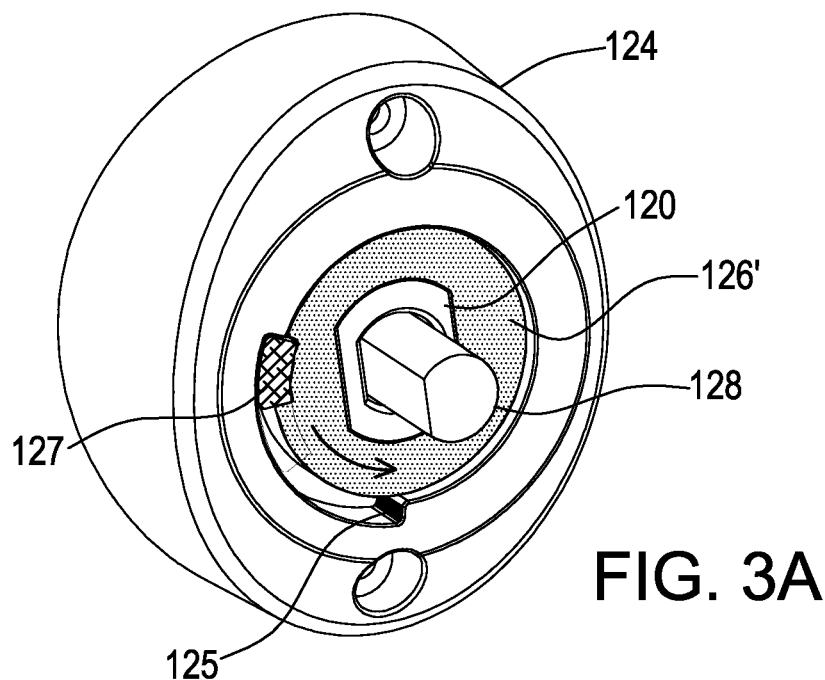
FIGS. 3A-B show different sized rotatable handle position stops.
Figure 3B:
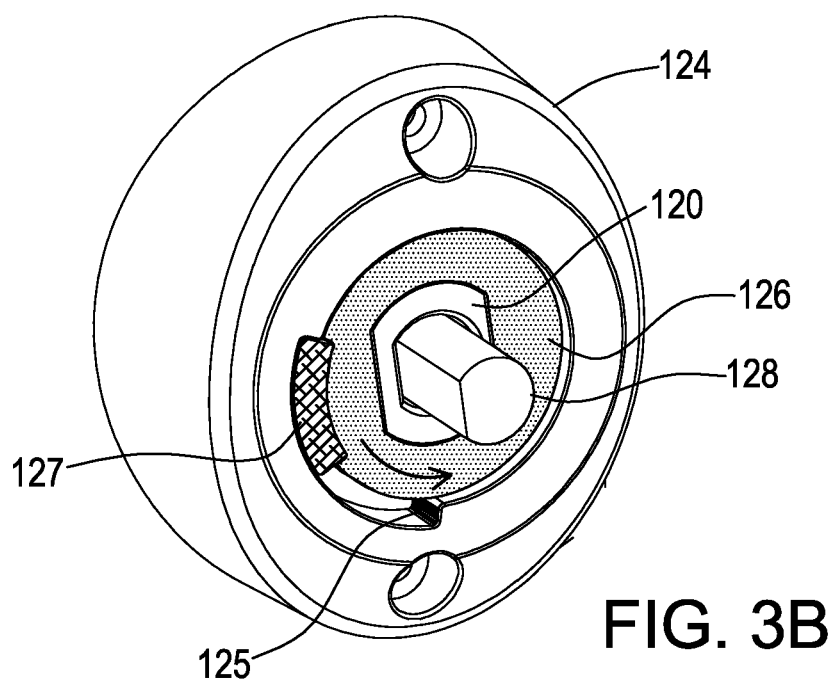

Referring now to FIGS. 3A-B, there are shown two identical fixed handle position stops 124, each having a different rotatable handle position stop 126 and 126'. Rotatable stop 126' has a shorter circumferential shoulder 127 than that of rotatable stop 126. Circumferential shoulder 127 may be provided in many different sizes, and as described above, with a shorter circumferential shoulder 127, rotatable handle position stop 126 has a longer distance to travel until it hits the edge of truncated rim 125, and therefore the valve 114 opening angle position will be larger. The larger the valve 114 opening angle position is, the greater the amount of dry food that will be dispensed per unit of time.

The rotatable handle position stop 126 may be adapted and is interchangeable within handle actuator 150, to match the valve 114 angle position to fit specific foods, according to their size, and according to the desired dispensing rate.

For example, for food which is provided in the form of granular material, a particular valve 114 opening angle may be desired. For food provided as cereal in the form of corn flakes, a different valve opening angle may be desired.

The design of handle actuator 150 enables the user to access its internal part, by removing handle 130, and extracting handle position stop 126. Thus, by replacing rotatable handle position stop 126 with a shoulder 127 having a different length, an adjustment of the valve 114 opening angle can be made, according to the food particle size, for granular foods, or for breakfast cereal flakes. The types and form of the food to be dispensed may vary, and the adjustment of rotatable handle position stop 126 can be made accordingly, to adjust the valve 114 opening angle as desired.

Figure 4A:
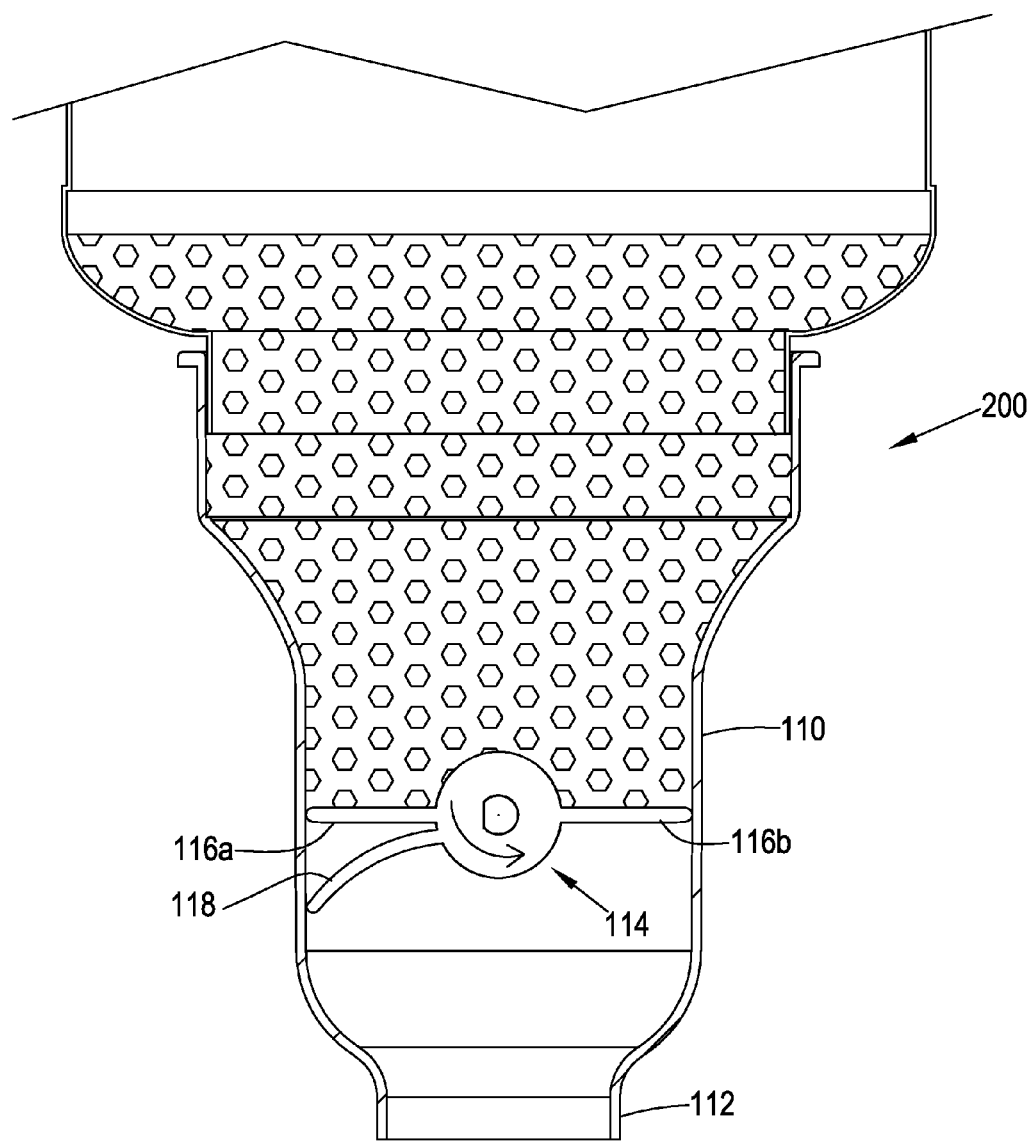
FIGS. 4A-C show the dispenser in a dispensing mode.
Figure 4B:
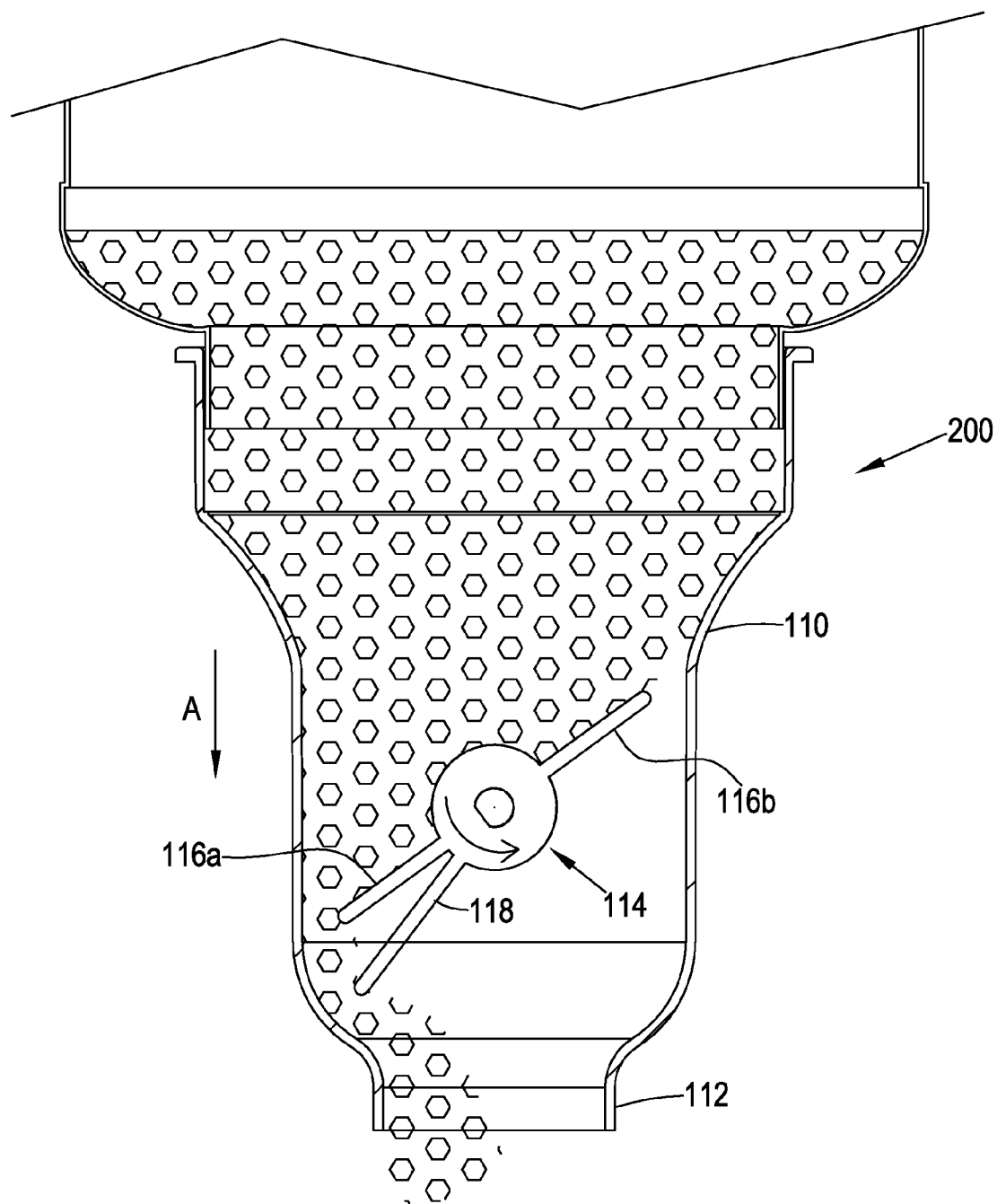
Figure 4C:
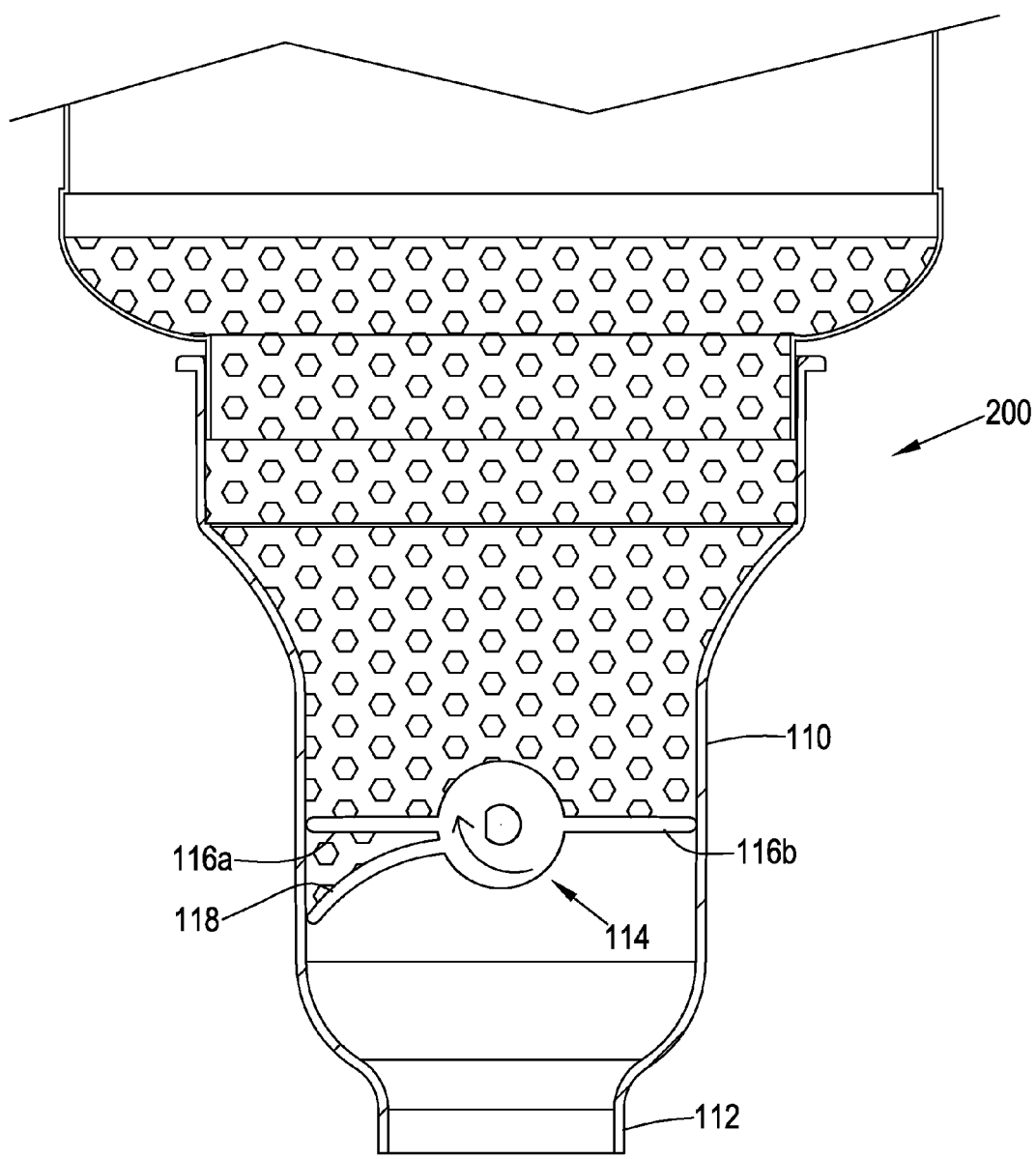

Referring now to FIGS. 4A-C, the operation of free-flow dispenser 200 is shown in dispensing mode.

FIG. 4A shows valve 114 in a leveled position, having wings 116a-b blocking the stored food from exiting dispenser 200.

FIG. 4B shows valve 114 tilted counter-clockwise, such that wings 116a-b are no longer blocking the food, and as shown by arrow A, the food is now allowed to bypass valve 114 in order to flow through dispensing aperture 112, to the user.

FIG. 4C shows valve 114 back in its level position, having wings 116a-b blocking the exit of the food. As shown, some of the food has escaped wing 116a but has been captured by long wing 118 which is disposed beneath wing 116a, thereby having the food lodged between wing 116a and wing 118 and not exiting the dispenser, thereby preventing unwanted leakage.

The overall product design for the inventive dispenser can be such that a simply constructed, easy-to-use dispenser is provided, featuring an adjustable valve 114 opening angle, to accommodate different types of dry food, whether they be in fine or coarse granular form, flakes or chunky-type food pieces, including toppings, powders and the like.

Although particular embodiments of the invention have been described and illustrated herein, it is recognized that modifications and variations may readily occur to those skilled in the art and consequently, it is intended that the claims be interpreted to cover such modifications and equivalents.

I claim:

1. A dry food dispensing device for controlling the flow of dry food when dispensed, said device comprising:
   a storage receptacle for containing dry food, wherein said receptacle is seated over a base providing a housing for a dispensing mechanism, said dispensing mechanism comprising;
   a turnable free flow valve having wings, said valve wings normally level and blocking free flow of said stored dry food from said storage receptacle, said valve being rotatable to a valve opening angle allowing free flow of said stored dry food,
   means for limiting said valve rotation to a predetermined position of said wings at said valve opening angle offset from said normal position; and
   a depressible handle for controlling said free flow valve angle rotation via said limiting means comprising a fixed handle position stop enclosing a rotatable handle position stop, wherein said fixed handle position stop comprises a first ring having an internal truncated rim forming an inner edge, and said rotatable handle position stop comprises a second ring rotatable within said first ring and having a circumferential shoulder of a predetermined length, such that when said shoulder hits said inner edge during rotation, a fixed valve opening angle is determined at said predetermined position,
   wherein when said handle is depressed and said valve is rotated to said predetermined position at said valve opening angle, said dispensing mechanism releases a portion of said stored dry food, said portion being determined by a user as a function of time said turnable free flow valve is held at said valve opening angle.

2. The dispensing device of claim 1 wherein said storage receptacle is removably seated over said base.

3. The dispensing device of claim 1 wherein said second ring is interchangeable within said first ring to enable adjustment of said valve opening angle as desired.

4. The dispensing device of claim 1 wherein an increase in said circumferential shoulder length over said predetermined length causes a corresponding decrease in said second ring rotation, thereby decreasing said fixed valve opening angle.

5. The dispensing device of claim 1 wherein a decrease in said circumferential shoulder length over said predetermined length causes a corresponding increase in said second ring rotation, thereby increasing said fixed valve opening angle.

6. The dispensing device of claim 1 wherein said means for limiting comprises a spring acting to restore said turnable free flow valve to said normal position once said depressible handle is released from said valve opening angle at said predetermined position.

7. The dispensing device of claim 1 wherein said turnable free flow valve comprises a pair of wings extending on either side of a rotatable shaft for blocking free flow of said stored dry food from said storage receptacle by sealing against inner walls of said storage receptacle, wherein said turnable free flow valve further comprises a third wing extending at an angle from said shaft and below an individual one of said pair of wings, having a length extending beyond said individual wing, to seal against said inner walls and prevent leakage of said stored dry food.

8. The dispensing device of claim 1 wherein said stored dry food may be provided in fine or coarse granular form, flakes or chunky-type food pieces, including toppings, powders and the like.

9. The dispensing device of claim 1 wherein said wings are formed of flexible material which minimizes mechanical interference with said stored dry food so as not to alter its shape or consistency.

10. A method of dispensing dry food by controlling the flow thereof, said method comprising:

providing a storage receptacle for containing dry food, wherein said receptacle is seated over a base providing a housing for a dispensing mechanism, said dispensing mechanism comprising;

a turnable free flow valve having wings, said valve wings normally level and blocking free flow of said stored dry food from said storage receptacle, said valve being rotatable to a valve opening angle allowing free flow of said stored dry food, and means for limiting said valve rotation to a predetermined position of said wings at said valve opening angle offset from said normal position; and a depressible handle for controlling said free flow valve angle rotation via said limiting means, and depressing said handle so as to rotate said valve to said predetermined position at said valve opening angle, wherein said predetermined position and said valve opening angle are adjustable as desired, wherein said adjustment is provided by said dispensing mechanism comprising a fixed handle position stop enclosing a rotatable handle position stop, wherein said fixed handle position stop comprises a first ring having an internal truncated rim forming an inner edge, and said rotatable handle position stop comprises a second ring rotatable within said first ring and having a circumferential shoulder of a predetermined length, such that when said shoulder hits said inner edge during rotation, a fixed valve opening angle is determined at said predetermined position, such that said dispensing mechanism releases a portion of said stored dry food, said portion being determined by a user as a function of time said turnable free flow valve is held at said valve opening angle.

11. The method of claim 10 wherein said adjustment is provided by interchanging said second ring within said first ring to change said valve opening angle.

12. The method of claim 10 wherein said valve opening angle determines a dispensing rate of said stored dry food flow.

13. The method of claim 12 wherein an increased valve opening angle establishes an increased stored dry food flow dispensing rate.

14. The method of claim 13 wherein a quantity of said stored dry food may be obtained by adjusting at least one of said dispensing rate and said time said turnable free flow valve is held at said valve opening angle.

15. The method of claim 10 wherein said dispensing mechanism is adapted for use by a pet depressing said handle.

16. The method of claim 10 wherein said dispensing mechanism is adapted for use by an automatic system depressing said handle.

* * * * *